(12) United States Patent
Bergholtz

(10) Patent No.: US 6,390,528 B2
(45) Date of Patent: May 21, 2002

(54) METHOD AND DEVICE FOR REDUCING REFLECTIONS AND CONTRASTS IN VENTILATION NOZZLES

(75) Inventor: Natalie Bergholtz, Göteborg (SE)

(73) Assignee: Volvo Personvagnar AB, Gothenburg (SE)

(*) Notice: Subject to any disclaimer, the term of this patent is extended or adjusted under 35 U.S.C. 154(b) by 0 days.

(21) Appl. No.: 09/751,315

(22) Filed: Dec. 28, 2000

(30) Foreign Application Priority Data

Dec. 29, 1999 (SE) ................................. 9904838

(51) Int. Cl.⁷ .............................................. B62D 25/14
(52) U.S. Cl. ................ 296/70; 296/97.7; 296/97.1; 296/97.2; 454/127
(58) Field of Search .................... 296/70, 97.7, 97.1, 296/97.2; 359/630, 13, 15, 629; 454/127

(56) References Cited

U.S. PATENT DOCUMENTS

| | | | | |
|---|---|---|---|---|
| 2,445,473 A | * | 7/1948 | Constant | 296/97 |
| 3,042,445 A | * | 7/1962 | Lamar | 296/97 |
| 4,449,747 A | * | 5/1984 | Morgan et al. | 296/97 |
| 5,002,327 A | * | 3/1991 | Bickford | 296/97.7 |
| 5,318,830 A | * | 6/1994 | Takamatsu et al. | 428/216 |
| 5,469,298 A | * | 11/1995 | Suman et al. | 296/37.7 |
| 5,549,345 A | * | 8/1996 | Cawthon et al. | 296/70 |
| 6,265,076 B1 | * | 7/2001 | McCurdy et al. | 428/432 |

FOREIGN PATENT DOCUMENTS

| | | | |
|---|---|---|---|
| DE | 3035282 | * | 4/1981 |
| EP | 0710581 | * | 11/1995 |
| EP | 0766102 | * | 9/1996 |

* cited by examiner

Primary Examiner—Ken Patel
(74) Attorney, Agent, or Firm—Kilpatrick Stockton LLP

(57) ABSTRACT

Method and device for avoiding reflections and contrasts in vehicle dashboards, wherein the dashboard 1 has one or more ventilation openings 3,4 along and at a distance from the lower edge of the vehicle windshield 2. Each ventilation opening 3,4 is covered by an air permeable cover 8, having a surface structure giving a low or insignificant contrast relative to the upper surface of the dashboard 1.

21 Claims, 3 Drawing Sheets

METHOD AND DEVICE FOR REDUCING REFLECTIONS AND CONTRASTS IN VENTILATION NOZZLES

TECHNICAL FIELD

The present invention relates to a device for avoiding reflections and contrasts in vehicle dashboards, wherein the dashboard has one or more ventilation openings along, and at a distance from, the lower edge of the vehicle windshield. More specifically, air permeable covers, having a surface structure giving a low or insignificant contrast relative to the upper surface of the dashboard, is placed over each ventilation opening.

BACKGROUND OF THE INVENTION

Typically, dashboards have a black or dark upper surface made from a suitable plastic material. Such a surface often causes reflections of sunlight that are reflected from the dashboard up unto the windshield where both the driver and front passenger can perceive it as being very annoying effect. Solutions to this problem are shown in EP 0766102 A1 which discloses a surface provided with certain patterns or irregularities for reducing reflections and in EP 0710581 B1 which discloses a surface coated by a material having short fibers for absorbing incident light.

The demand for more colors, especially brighter colors, in interior trim for vehicles has resulted in problems with contrasts, in addition to the existing problem of light reflections. A particular problem arises when such features as ventilation nozzles are located in the upper surface of the dashboard. In one aspect, these openings give a sharp contrasting effect relative to the dashboard; in another, the openings cause reflections on the windshield in the field of view of the driver and the front passenger. The problem occurs when the ventilation nozzles are moved a distance out an into the dashboard away from the lower edge of the windshield.

Traditionally, such nozzles have been placed at the very front of the dashboard, as near the lower edge of the windshield as possible in order to minimize resulting contrasts and reflections. A problem with this positioning, however, is that cold, damp air from the passenger compartment is drawn into the air current due to the so-called ejector effect. A further disadvantage is that the air current does not follow the windshield to its upper edge. In fact the air current leaves the windshield much too soon. This phenomenon can be clearly observed during defrosting procedures when the produced air current causes only a number of localized, slowly defrosting areas along the lower edge of the windshield. This type of nozzle positioning can be seen in EP 0710 581-B1 at FIG. 4.

Problems can arise even when dark or black dashboards are used, as the outer frame and edges in and around the ventilation nozzle can reflect light and cause both contrasts and reflections in the windshield. Solutions for anti-reflex treatment do not solve the problem of reflections from such components inside the opening of a ventilation nozzle.

Some manufacturers have tried to solve the problem by coloring the front section of the dashboard; this, however, adds extra cost. Another solution is to place the ventilation nozzle in a central position on the dashboard in order to avoid reflections in the field of view. The latter alternative results in somewhat fewer reflections, but may instead cause problems with contrasts and less effective ventilation.

In view of the above described deficiencies associated with known solutions for avoiding reflections and contrasts from being projected off of the dashboard onto the windshield, the present invention has been developed to alleviate these drawbacks and provide further benefits to the user. These enhancements and benefits are described in greater detail hereinbelow with respect to several alternative embodiments of the present invention.

SUMMARY OF THE INVENTION

The present invention in its several disclosed embodiments alleviates the drawbacks described above with respect to conventional designs device for reducing reflections and contrasts from the dashboard onto the windshield and incorporates several additional beneficial features.

These problems are resolved by providing a dashboard, the upper surface of which has nozzles for ventilation and defrosting, placed at a distance from the lower edge of the windshield and directly in front of the driver and front passenger(s). Further, the air current produced from these nozzles is directed to hit the windshield at about a third of its vertical extent and the nozzle is provided with a covering that has a permeable surface. The surface has a surface structure giving a small or negligible contrast relative to the surface of the dashboard. The air permeable surface can, for instance, comprise a lattice or mesh having the color of the dashboard, or, alternatively, a nuance of this color or a mixture of colors, which in combination has a low contrasting effect. Covering the nozzle(s) in this way also reduces reflections, caused by the nozzle, onto the windshield.

The lattice or mesh can be made with openings having a suitable geometric shape such as circular, oval, triangular, square, hexagonal or other geometry. The air permeable area of the surface, in relation to its total surface area, must be sufficiently large to prevent resistance to the air current which must pass therethrough from becoming too large. At the same time, it must not be so large that the contrast reducing effect is lost, or that reflections from underlying components, such as guiding vanes for the air current may penetrate or show therethrough. This is especially true for defrosting or clearing of fogged-up window procedures which require large volumes of dry or warm air.

In this way it is possible to avoid both reflections from incident light onto the windshield, as well as disturbing contrasts in the main field of view of the driver and front passenger(s).

The beneficial effects described above apply generally to the exemplary devices, mechanisms and methods disclosed herein for the present invention. The specific structures and steps through which these benefits are delivered will be described in greater detail hereinbelow.

BRIEF DESCRIPTION OF THE DRAWINGS:

The invention will now be described in greater detail in the following way, by example only, and with reference to the attached drawings, in which.

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
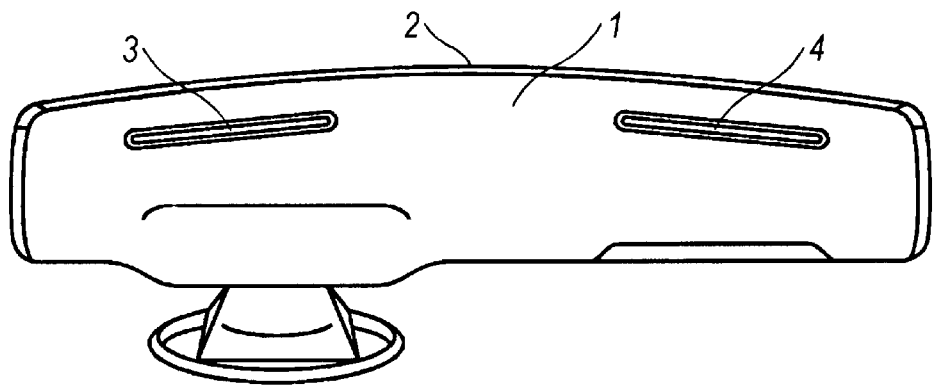
FIG. 1 shows a top plan view of the upper surface of a dashboard.

FIG. 1 shows a schematic representation of the dashboard area of a vehicle. The dashboard 1 is adjacently located to a windshield 2 along the dashboard's 1 front edge. The dashboard 1 is provided with a pair of ventilation nozzles 3,4 in an upper surface thereof at distance from the lower edge of the windshield 2. The nozzles 3,4 are positioned at such a distance from the front edge of the dashboard 1 that an air stream from the nozzles 3,4 reaches the windshield 2 at about one third of its height, measured from a lower edge of the windshield 2. The preferred distance between the point of impact of dispensed air from an intersection between the windshield 2 and the dashboard 1 varies depending on the angle therebetween. If the windshield is angled at about 50° from the vertical plane, the distance is in a range of approximately 100–140 mm. At an angle of about 60°, a suitable distance will be in the range of approximately 170–225 mm. In general, the larger the inclination of the windshield 2, the longer the distance between the intersection point and the nozzles. This type of configuration would normally lead to an increased contrast to the dashboard 1, as well as placing reflections thereof correspondingly higher, up on the windshield 2. A produced air stream is conducted to the nozzles 3,4 using existing channels 5 schematically demonstrated in FIG. 2, whereafter the air is guided in a desired direction by the nozzles 3,4.

Figure 2:
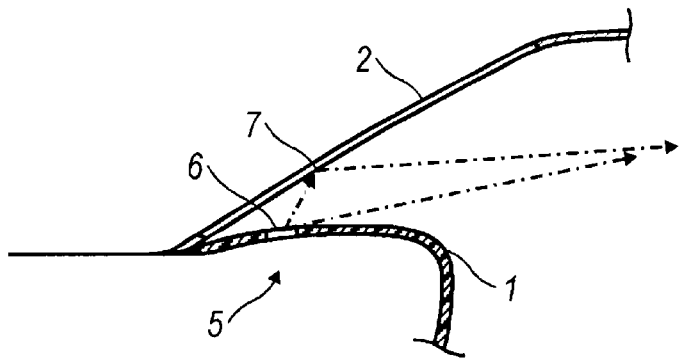
FIG. 2 shows a side, elevational cross-section through the dashboard and windshield taken along a longitudinal direction of the vehicle.
Figure 3:
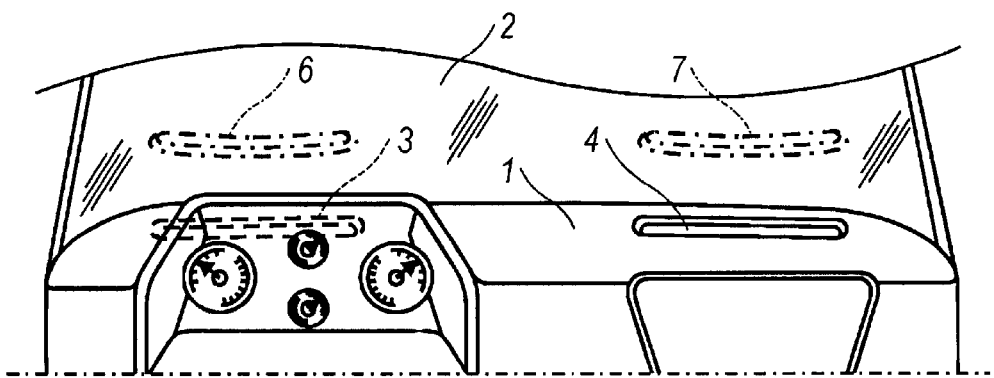
FIG. 3 shows a perspective view of the dashboard and windshield area as seen from the driver's seat.

As can be seen in FIGS. 2 and 3, both the driver and the front passenger can be disturbed both directly by the contrast between the dashboard 1 and the nozzle 3,4, and indirectly by reflections 6,7 from the nozzles 3,4 and related components at the windshield 2. The former is particularly annoying when the dashboard 1 is made from a light colored material, while the latter occurs independently of the color and surface structure (e.g. an anti-reflex treatment) of the dashboard.

Figure 4A:
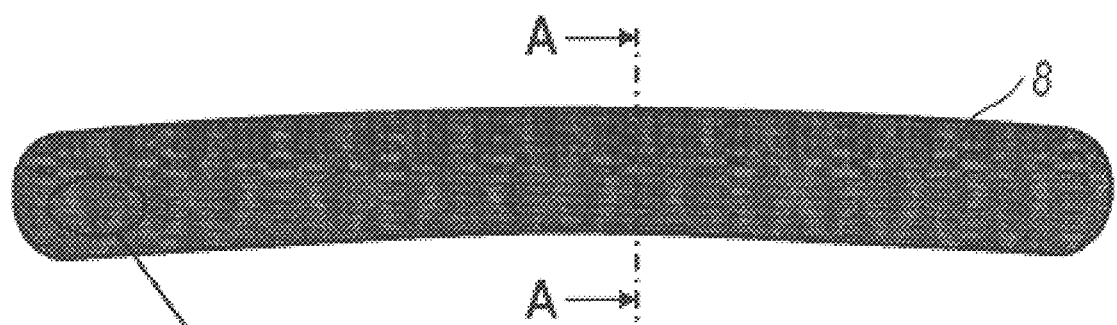
FIG. 4A shows a plan view of a lattice cover according to the present invention.

FIG. 4A shows an air permeable surface cover in the shape of a perforated lattice 8 made from metal or a plastics material which can be attached over the ventilation nozzle 3,4. The lattice is preferably attached by pressing it onto the nozzle 3,4 for a secure fit thereabout.

It is, of course, also possible to attach the lattice 8 by glueing, welding, other snap-on configurations and/or otherwise suitable methods/mechanisms for attachment. The cover can also be manufactured as a wire mesh of metal or plastic. According to a further embodiment, the cover and nozzle 3,4 can be integrated into a single component, possibly of unitary construction.

The nozzle 3,4, complete with a lattice 8, can then be attached to the dashboard 1 in a known manner, such as by friction welding.

Figure 4B:
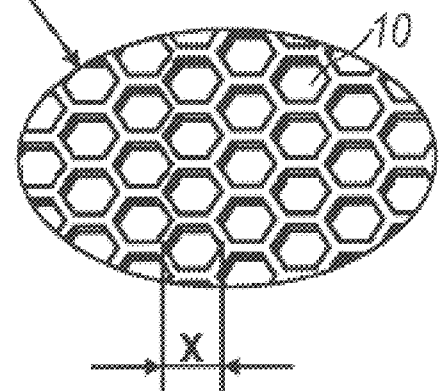
FIG. 4B shows an enlarged view of the lattice cover of FIG. 4A.

In order to provide sufficient permeability, i.e. to reduce the resistance to the flow of air through the nozzle 3,4, the lattice 8 is provided with a large number of perforations pursuant to the lattice construction. FIG. 4B shows hexagonal holes, but these can of course be given any suitable geometric form, e.g. round, oval, triangular, square, or a combination of one or more of these or other suitable shapes. The largest measurement "x" of the hole (as depicted in FIG. 4B), taken at the cross-section of a main plane of the lattice, is preferably less than 3 mm; such a configuration gives a suitable balance between reflex reduction from underlying components 9 and low contrast relative to the dashboard's 1 top surface. An especially preferred measurement for each hole is 1–3 mm. The total surface area of the holes should be approximately 70–90% of the surface area of the cover. The thickness of the lattice should be less than 3 mm, and preferably between 0.5 and 2 mm.

Figure 4C:
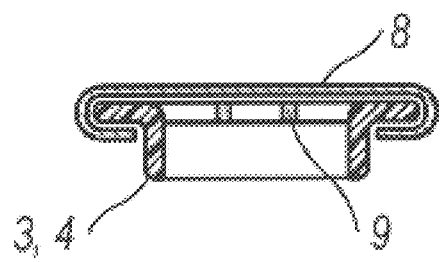
FIG. 4C shows a substantially vertical cross-section through the lattice arrangement.
Figure 5A:
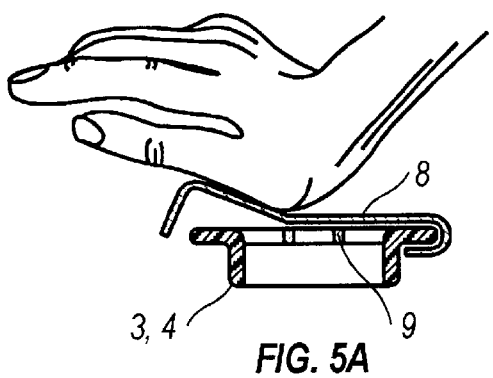
FIG. 5A shows a substantially vertical cross-section through the lattice arrangement being pressed onto a ventilation nozzle.
Figure 5B:
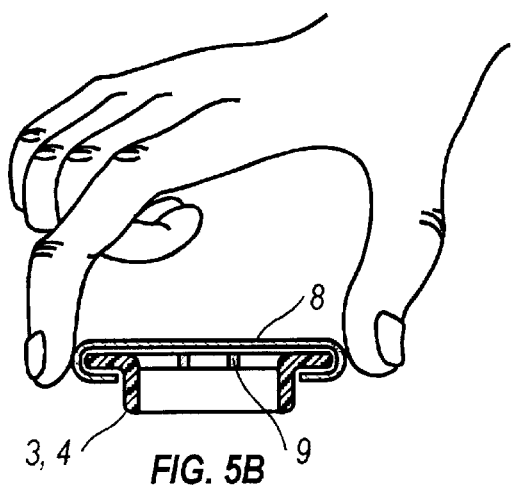
FIG. 5B shows a substantially vertical cross-section through the lattice arrangement being attached to a ventilation nozzle by a snap-on attachment.
Figure 5C:
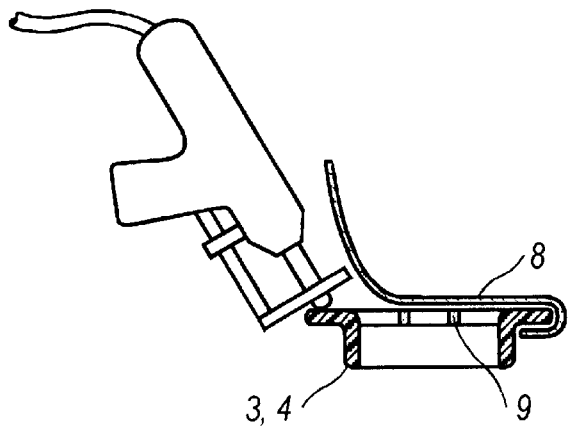
FIG. 5C shows a substantially vertical cross-section through the lattice arrangement being attached to a ventilation nozzle by a glued attachment.
Figure 5D:
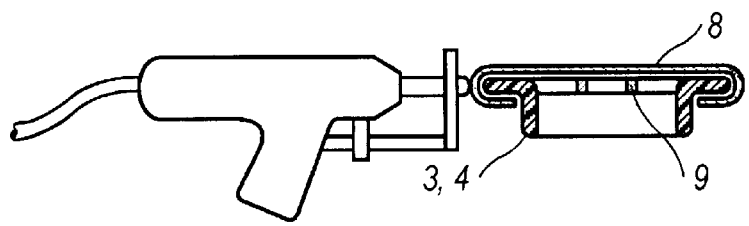
FIG. 5D shows a substantially vertical cross-section through the lattice arrangement being attached to a ventilation nozzle by a welded attachment.

As shown in FIG. 4C, the cover 8 is friction-fit about an upper lip of the nozzle 3,4 thereby fixing the cover 8 relative to the dashboard 1. This is accomplished by positioning a lip-receiver of the cover 8 about the upper lip of the nozzle 3,4 for affecting releasable fixation of the cover 8 to the nozzle 3,4 and relative to the dashboard 1.

What is claimed and desired to be secured by Letters Patent is as follows:

1. A device for avoiding reflections and contrasts from a dashboard in a vehicle, said dashboard having an upper surface provided with one or more nozzles for ventilation in said upper surface placed along, and at a distance from, a lower edge of a windshield, and each ventilation nozzle being provided with an air permeable cover with a surface structure giving a negligible contrast relative to the upper surface of the dashboard.

2. The device as recited in claim 1, wherein the cover is a perforated lattice.

3. The device as recited in claim 1, wherein the cover is constructed from metallic mesh.

4. The device as recited in claim 1, wherein the cover is constructed from plastic mesh.

5. The device as recited in claim 2, wherein the cover is pressed onto the ventilation nozzle.

6. The device as recited in claim 2, wherein the cover is attached to the ventilation nozzle by a snap-on attachment.

7. The device as recited in claim 2, wherein the cover is attached to the ventilation nozzle by a welded attachment.

8. The device as recited in claim 2, wherein the cover is attached to the ventilation nozzle by a glued attachment.

9. The device as recited in claim 1, wherein the air permeable surface of the cover is provided with a number of holes of a suitable geometrical shape, whereby the largest measurement of each hole in the main plane of the cover is less than 3 mm.

10. The device as recited in claim 1, wherein the total surface area of the holes is 70–90% of the surface area of the cover.

11. A method for avoiding reflections and contrasts from a dashboard onto a windshield of a vehicle, the method comprising:

providing a dashboard with an upper surface having at least one nozzle located therein for directing ventilation toward an associated windshield, said dashboard intersecting said windshield at a forward edge of said dashboard and a lower edge of said windshield; and covering each of said at least one nozzles with an air permeable cover, said cover having an upper surface structure configured to minimize contrast relative to said upper surface of said dashboard.

12. The method as recited in claim 11, further comprising:

configuring said cover from a perforate lattice material.

13. The method as recited in claim 11, further comprising:

selecting a material of construction for said cover that is of low-contrast color to said dashboard.

14. The method as recited in claim 11, further comprising:

press-fitting said cover onto said at least one nozzle thereby fixing said cover relative to said dashboard.

15. The method as recited in claim 11, further comprising:

permanently-fitting said cover onto said at least one nozzle thereby fixing said cover relative to said dashboard.

16. The method as recited in claim 11, further comprising:

affecting said permanent-fitting of said cover onto said at least one nozzle by welding.

17. The method as recited in claim 11, further comprising:

affecting said permanent-fitting of said cover onto said at least one nozzle by glueing.

18. The method as recited in claim 11, further comprising:

friction-fitting said cover about an upper lip of said at least one nozzle thereby fixing said cover relative to said dashboard.

19. The method as recited in claim 17, further comprising:

positioning a lip-receiver of said cover about said upper lip of said at least one nozzle thereby fixing said cover relative to said dashboard.

20. The method as recited in claim 11, further comprising:

configuring said upper surface of said air permeable cover to have geometric perforations therethrough, each of said perforations having an opening of cross-wise dimension less than 3 mm.

21. The method as recited in claim 11, further comprising:

configuring said openings in said air permeable cover to constitute 70–90% of an upper surface area of said cover.

\* \* \* \* \*